(12) United States Patent
Rauchholz et al.

(10) Patent No.: US 12,422,804 B2
(45) Date of Patent: Sep. 23, 2025

(54) MODULAR CONTROL SYSTEM AND METHOD FOR DYNAMICALLY ADAPTIVE PROCESS CONTROL OF A PLANT IN A MACHINE-TO-MACHINE NETWORK

(71) Applicant: Buhler AG, Uzwil (CH)

(72) Inventors: Sascha Rauchholz, Cologne (DE); Mario Arlitt, Windeck (DE)

(73) Assignee: Buhler AG, Uzwil (CH)

( * ) Notice: Subject to any disclaimer, the term of this patent is extended or adjusted under 35 U.S.C. 154(b) by 0 days.

(21) Appl. No.: 17/654,712

(22) Filed: Mar. 14, 2022

(65) Prior Publication Data
US 2022/0299961 A1    Sep. 22, 2022

(30) Foreign Application Priority Data
Mar. 18, 2021    (EP) ..................................... 21163544

(51) Int. Cl.
G05B 19/042    (2006.01)
(52) U.S. Cl.
CPC .. G05B 19/042 (2013.01); *G05B 2219/23389* (2013.01)
(58) Field of Classification Search
CPC ........ G05B 19/042; G05B 2219/23389; G05B 19/41845; G05B 2219/25086; G05B 2219/31075; G05B 2219/32019; G05B 2219/32404; G05B 19/41855
See application file for complete search history.

(56) References Cited

U.S. PATENT DOCUMENTS

| | | | |
|---|---|---|---|
| 2015/0173955 A1* | 6/2015 | Macura | A61F 13/15 493/374 |
| 2018/0088548 A1* | 3/2018 | Sangi | G05B 19/05 |
| 2019/0106283 A1 | 4/2019 | Yamaoka et al. | |
| 2022/0043431 A1* | 2/2022 | Sayyarrodsari | G06Q 10/063 |

FOREIGN PATENT DOCUMENTS

| | | | | |
|---|---|---|---|---|
| EP | 940086 A1 | 9/1999 | | |
| EP | 3111768 A1 | 1/2017 | | |
| KR | 2019133468 A | * 12/2019 | ....... | G05B 19/41845 |

OTHER PUBLICATIONS

Dr Matthias Graf, et al., "Modular Production Plants for Hybrid Components", Karlsruhe Institute of Technology, Kaiserstrasse 12 76131 Karlsruhe, KIT 2019.

* cited by examiner

*Primary Examiner* — Michael W Choi
(74) *Attorney, Agent, or Firm* — Colson Law Group, PLLC

(57) ABSTRACT

Proposed is system and method for modular control system providing a dynamically adaptive process control of a process line of a plant in a Machine-to-Machine network. The process line of the plant comprises a plurality of distributed machine control system with one or more elements interlocked to one or more operational unit of the process line. The operation of an operational unit performing a physical function within the process line is controlled by an associated machine control system by means of the elements interlocked to the operational units. The interlocked elements at least comprise IO-interfaces and actor control devices.

14 Claims, 9 Drawing Sheets

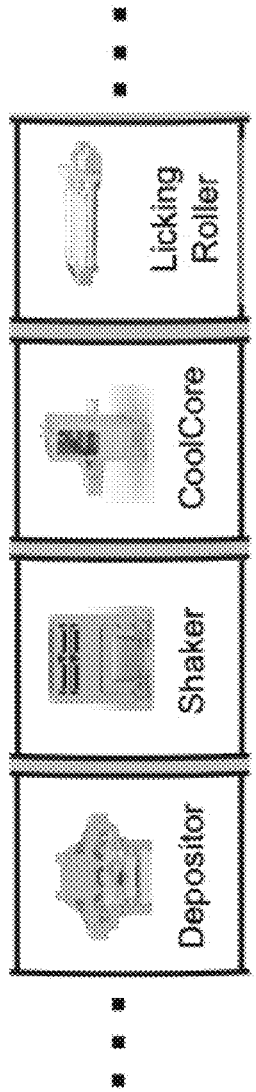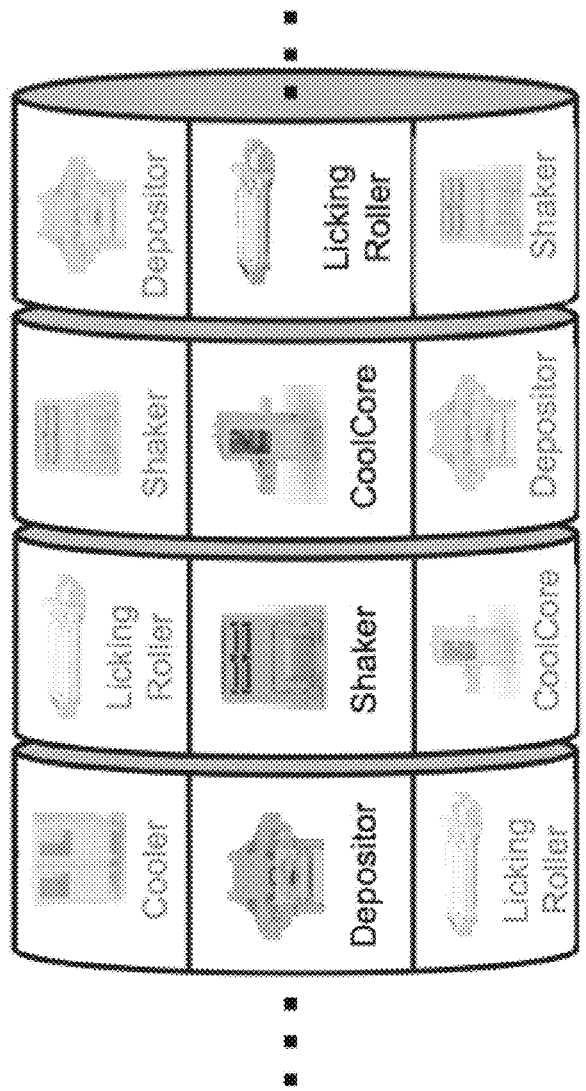
Fig. 1

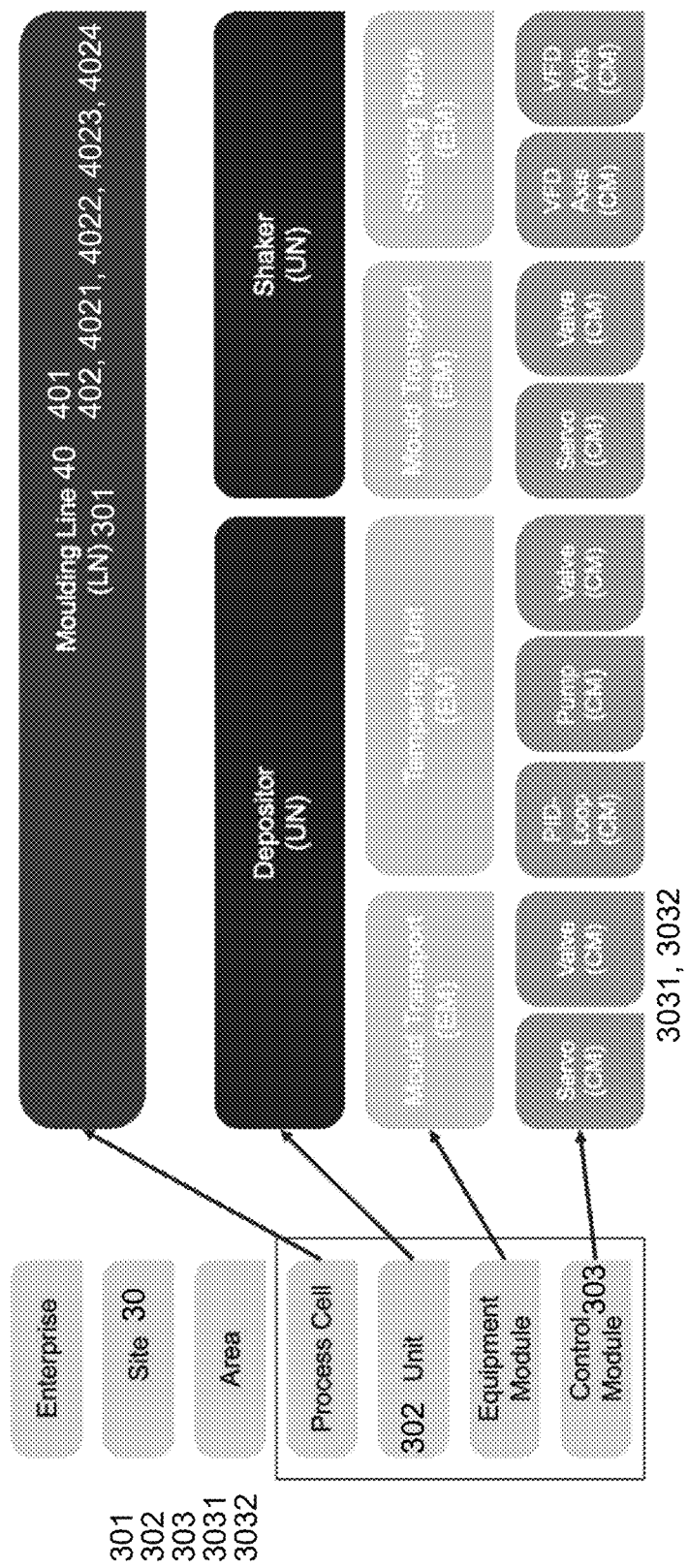
Fig. 4.1

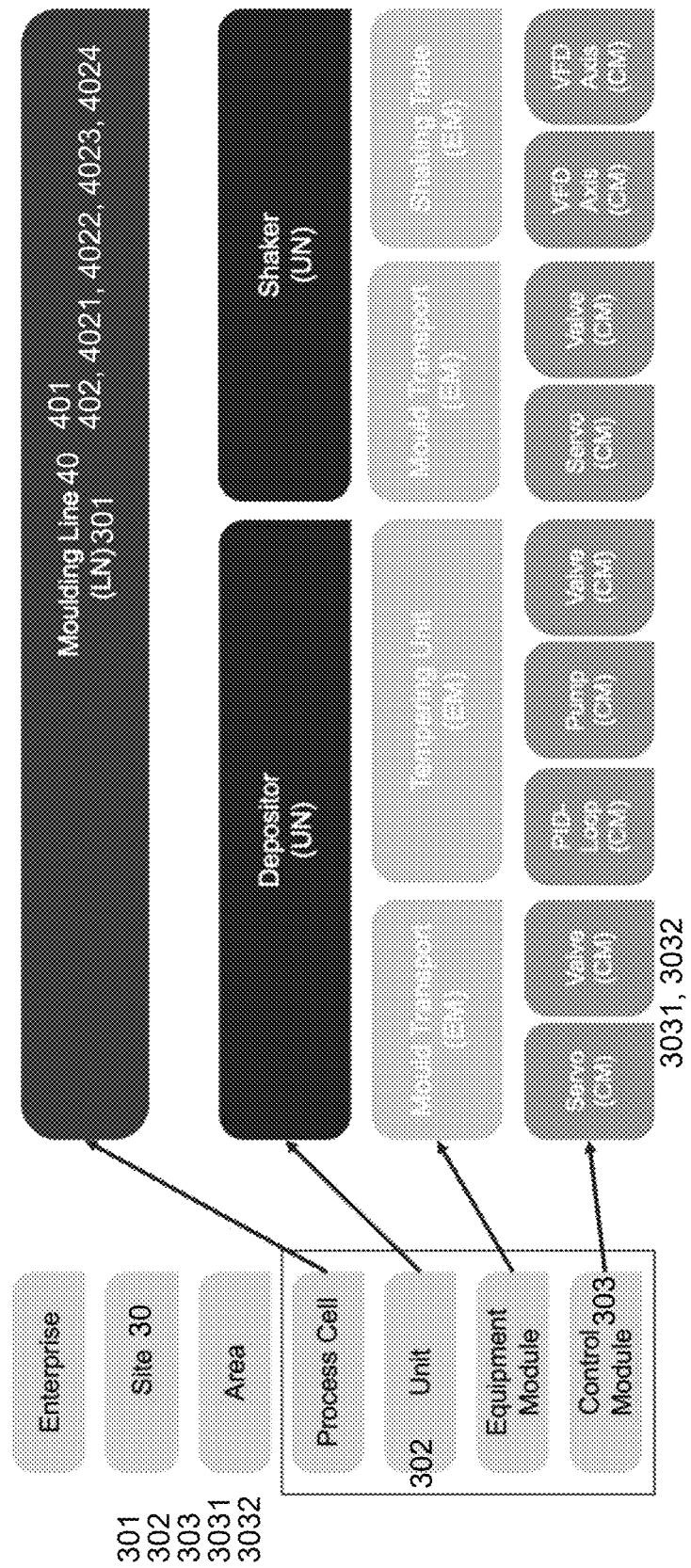
Fig. 4.2

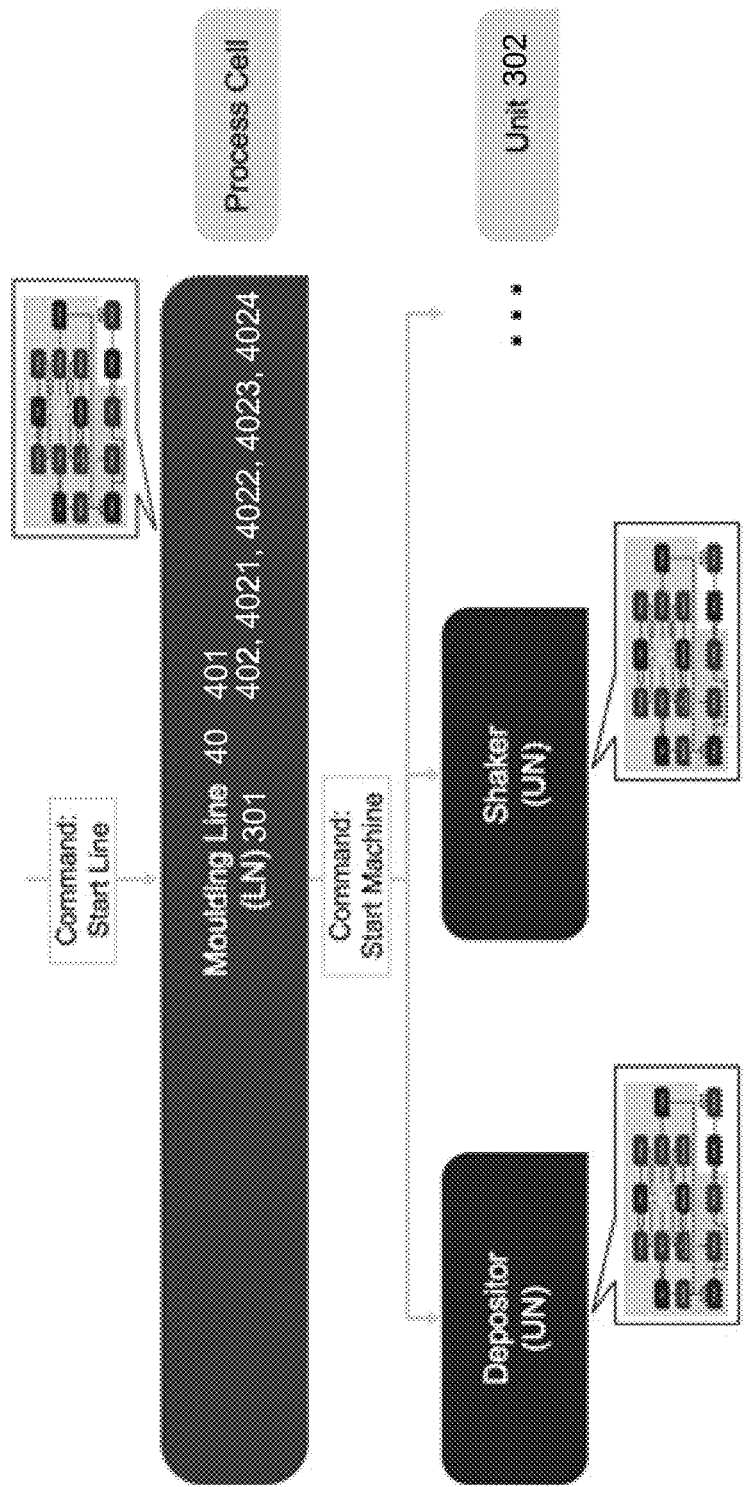
Fig. 5.1

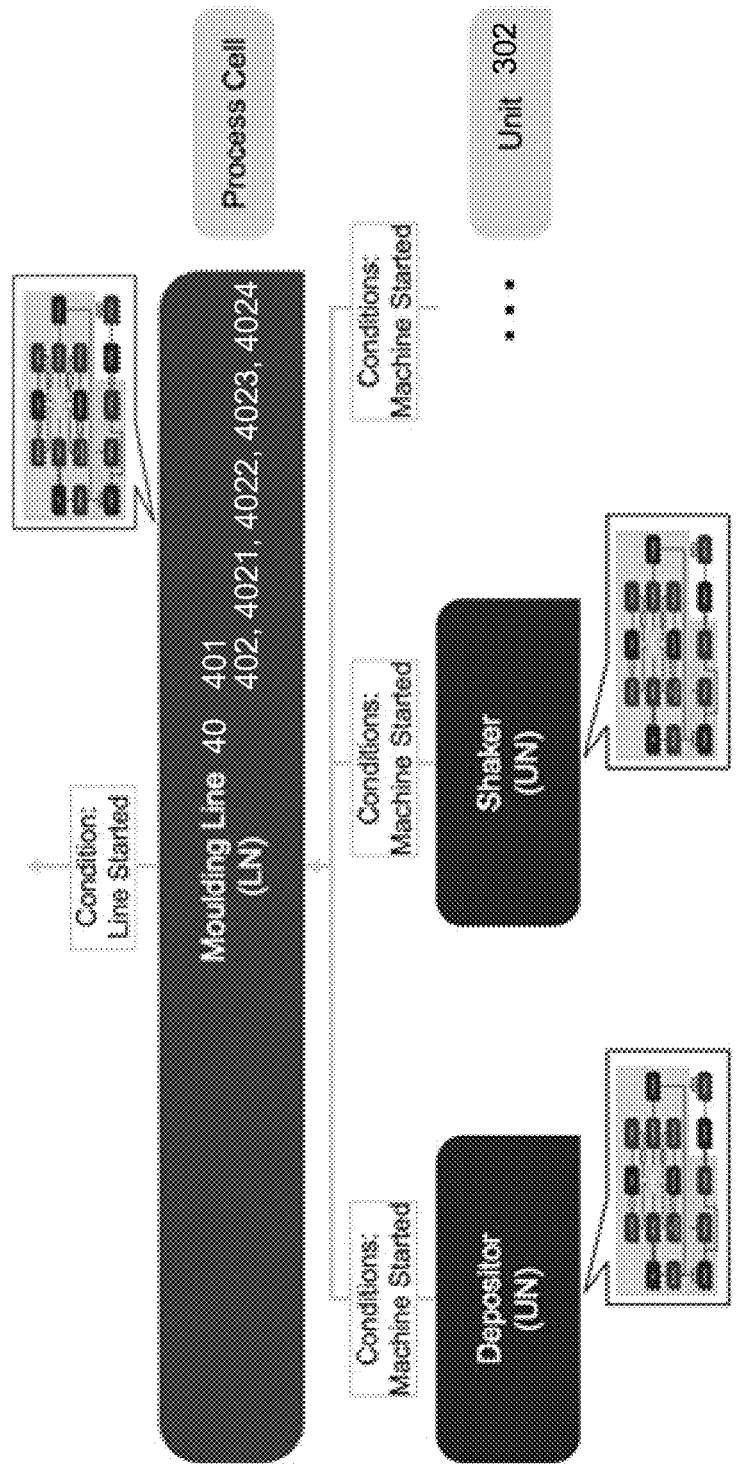
Fig. 5.2

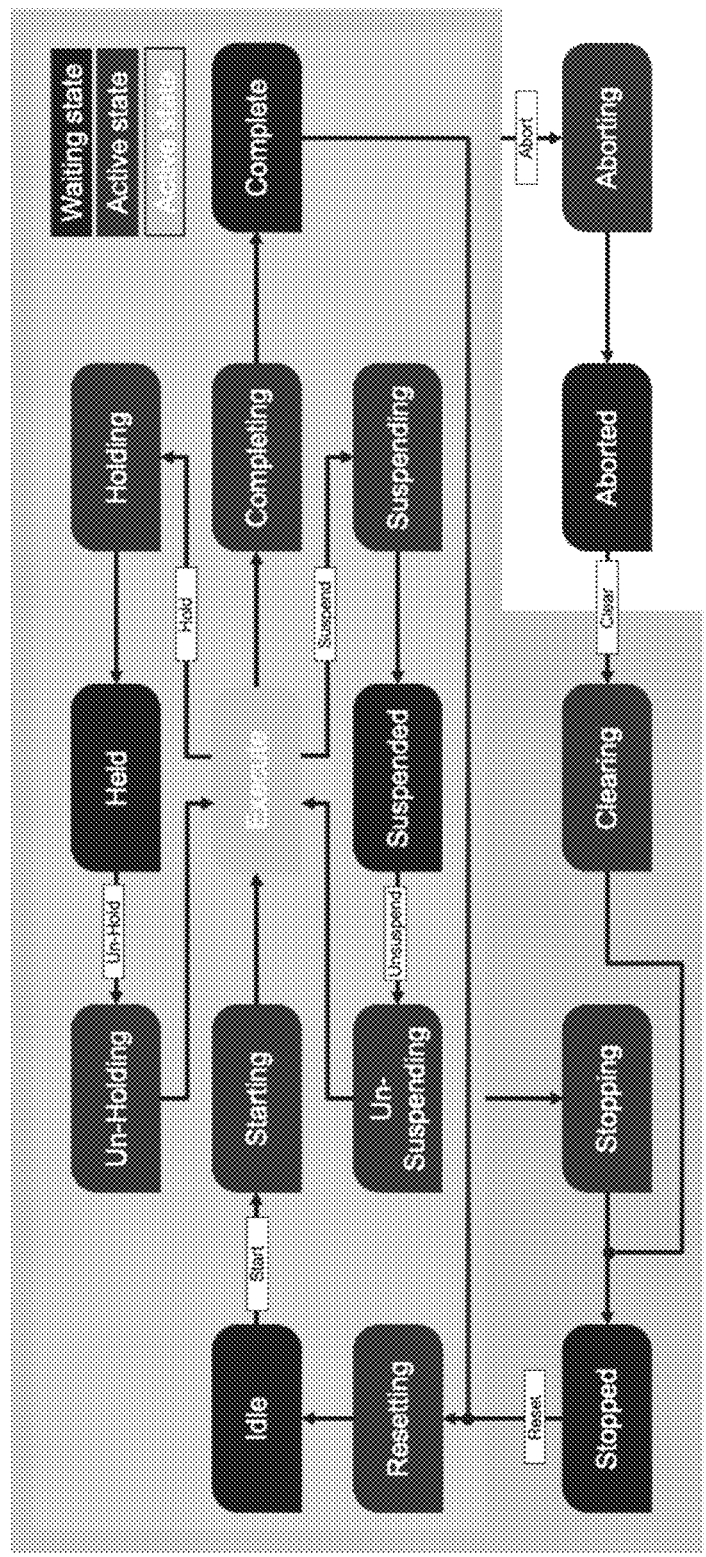
Fig. 5.3

MODULAR CONTROL SYSTEM AND METHOD FOR DYNAMICALLY ADAPTIVE PROCESS CONTROL OF A PLANT IN A MACHINE-TO-MACHINE NETWORK

CROSS-REFERENCE TO RELATED APPLICATIONS

This application claims priority pursuant to 35 U.S.C. 119(a) to European Patent Application No. 21163544.6, filed Mar. 18, 2021, which application is incorporated herein by reference in its entirety.

FIELD OF THE INVENTION

The present invention generally relates to the field of electronic process control. More particularly, the present invention relates to a modular, interchangeable architecture for a self-adapting controlling, steering and executing of process control operation, applications and/or operational units of process line of a plant, as e.g. depositor unit, mould transport unit, tempering unit or shaker of a moulding line in a food production plant. Most particularly, the present invention relates to process control of network devices, in particular plant and plant systems having a process line, in a Machine-to-Machine (M2M) network having a direct communication between devices and/or a central system using an appropriate communication channel Even more particularly, the invention relates to a modular control system for plants associated with the plant control system comprises a plurality of interlocked elements, as I/O interfaces and actor or actuator control of one or more operational unit of the plant. In these systems, the operation of the operational units are controlled by the plant control system via the elements interlocked to the plant control system, i.e. the actuators, where the operational unit, as operational units of a process line, are devices performing a mechanism or process within the process line, for example opening a valve, activating and operating power electronic drives, collecting sensor information, and the like.

BACKGROUND OF THE INVENTION

Production and process lines of plants known from prior art are usually constructed to be rigid and inflexible. In particular, the conveyor technology used is installed in a fixed manner and therefore does not allow an adaptation of the production or process line depending on new needs, as the change of the sequence of processing units within a process line. Though, advances in industrial process control technology have improved many aspects of factory and plant operation, this inflexibility still remains. Historically, before today's modern industrial process control systems, industrial processes were operated and controlled by humans and rudimentary mechanical controls. As a consequence, the complexity and degree of control over a process was limited by the speed with which a human could ascertain a present status of various process state variables, compare the current status to a desired operating level, calculate a corrective action (if needed), and implement a change to a control point to affect a change to a state variable. Improvements to the process control technology were enabling larger and more complex industrial processes to be controlled via programmed control processors. Control processors execute control and/or steering programs that read process status variables, execute instruction commands associated with control algorithms based upon the status variable data and desired set point information to render output values for the control points in industrial processes. Such control processors and programs support a substantially self-running industrial process. In spite of the ability of industrial processes to operate under the control of programmed process controllers at previously established operational parameters without human intervention, supervisory control and monitoring of control processors and their associated processes is desirable. Such oversight is provided by both humans and higher-level control programs at an application/human interface layer of a multilevel process control network. Such oversight is generally desired to verify proper execution of the controlled process under the lower-level process controllers and to configure the set points of the controlled process.

Manufacturing and process control systems have to be modified if changes in the process control devices, the sequence of processing units in a process line or the processes themselves are required. Thus, it is important to provide means for quickly configuring/re-configuring without touching unchanged portions of the system. It is also important to provide means for making such changes while minimizing disruptions to the operation of the industrial process, e.g., minimizing the time that the process stands idle. Further, in view of the need to continually improve supervisory process control and process/manufacturing information systems, there is a strong desire to not be locked into a single architecture of a process line or a supervisory process control and manufacturing information system. Such inflexibility of plant control systems is undesirable though at the present point inevitable in the conservative industrial control systems market. The process control industry tends to pilot, and often the designers are not fully aware of the full extent, form and sequence of the automation that will ultimately be incorporated in a final installation. Later in the life of a plant, when new functionality is added the new control system components leverage or merge existing systems. In such instances where the process control system needs to be changed significantly, there are advantages to be able to incorporate a new architecture of a process line layout based on arrangement of machines within the process line, where the new production process is based on the new arrangement of the machines in the production or process line. In prior art systems, the whole mostly manufacturer-specific plant control systems has to be costly rebuild by programming experts of the specific manufacturer.

Modular control systems, used today in a variety of industries, are complete control systems that can provide specific functionality. A modular control system can e.g. be implemented as a skid-mounted system, so called because the system is enclosed within a frame and is easily transported. A skid can be delivered to a factory as an integral unit, without being disassembled and reassembled, and typically preconfigured by the manufacturer. A skid generally includes a programmable logic controller (PLC), specialized equipment such as valves or boilers, and sensors such as pressure or temperature sensors, for example. On the other hand, distributed control systems can be used to control the production or process line, a batch, a fed-batch, and continuous processes operating the control at the site or at remote locations. Process lines typically include one or more process controllers communicatively coupled to one or more field devices via analog, digital or combined analog/digital buses, or via a wireless communication link or network. Collectively, the various devices perform monitoring, control, and data collection functions to control the process, safety shutdown systems, fire and gas detection systems, machine health monitoring systems, maintenance systems, decision support, and other systems. The field devices, which may be, for example, valves, valve positioners, switches and transmitters (e.g., temperature, pressure, level and flow rate sensors), are located within the process line and generally perform physical or process control functions such as opening or closing valves, measuring process parameters, etc. to control one or more processes executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices. The control modules in the controller send the control signals over the communication lines or links to the field devices to thereby control the operation of at least a portion of the process line or production line.

Information from the field devices and the controller is usually made available over a data highway to one or more other hardware devices, such as operator workstations, personal computers or computing devices, data historians, report generators, centralized databases, or other centralized administrative computing devices that are typically placed in control rooms in loco or other locations close to the plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths. As an example, multiple applications can be stored within a control system and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration engineer to create or to change operator interfaces, which are used by a viewing application to display data to an operator, and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data application for storing historical data is typically executed by a data capturing device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Devices operating in process control and industrial automation systems can be interconnected in a wired or wireless manner, and communicate using industrial communication protocols. Further, protocols have been developed to interconnect PLCs. In addition to standard industrial automation protocols there exist a great number of proprietary protocols for interconnecting nodes in a process control system. In general, these proprietary protocols specify formats for conveying measurements, alerts and status reports, commands that affect process variables or automation parameters, commands for activating or deactivating devices, etc. A typical industrial communication protocol also supports device configuration, via pre-defined commands or commands defined by manufacturers for specific devices in accordance with the syntax of the protocol.

While using processing units or modular skids in a process line equipped with PLCs is a possible approach to building a process or production lines, the controlling PLCs today cannot be integrated natively into a large control systems. PLCs generally rely on proprietary protocols, configuration, and security. At best, operators can use rudimentary and manual integration, if a standard protocol is available, to bring PLCs into a larger system. Such a rudimentary integration is a manual process that does not withstand certain types of changes and requires manual maintenance as the system evolves and the sequence in the process line may change or adapt. In addition, PLCs may experience configuration limitations because PLCs typically have limited, or difficult to manage, port configuration options. For example, a PLC's configuration limitations can be attributable to a PLC's communication ports limitations or inability to communicate with other nodes of a process plant via a network or data highway of the process plant. For example, a typical PLC may include dedicated communication ports that allow only certain types of protocols, such that other nodes in the process plant, communicating using different protocols, would not be able to connect to the PLC via the dedicated ports. The dedicated ports are especially problematic where the PLC has few or a limited number of communication ports. For example, a PLC providing a single dedicated port for each of a variety of communication protocols (e.g., one port for Modbus, another port for Ethernet, etc.) may inhibit the PLC from retransmitting communications from one port to another port, e.g., because of the different and incompatible communication protocols. Limited communication ports may also cause problems when a PLC needs to communicate, e.g., receive instructions from and/or provide data to, multiple nodes using the same type of communication protocol, but where the PLC does not have enough communication ports to accommodate all of the nodes of that particular type of communication protocol. In such situations, the PLC would need to utilize multiple external switches to accommodate the additional nodes of the particular communication protocol, which would increase the complexity and costs associated with the process control system of the process plant. Finally, in instances where isolation is desired for security reasons, for example, to prohibit certain nodes of the control system from communicating with other nodes via the PLC, then the limited configuration options of the PLC's communication ports creates additional problems. For example, in such instances, the PLC may have limited or no means to control the retransmission of communications (e.g., data packets or messages) to other ports of the PLC. This can lead to security issues where an operator of a skid may desire to prevent certain ports of the PLC from communicating with other ports associated with the PLC in order to control secure access among the nodes connected PLC. In such instances, the skid operator may be forced to add external firewalls to the PLC in order to implement secure access among the nodes connected to the PLC, which would create increased complexity and costs associated with the distributed process control system of the process plant. In addition, such configurations would require additional programmatic and settings configurations to the PLC by the operator, which can be complex, and which can be burdensome because the skid operator would typically have to manually implement such programmatic and settings configuration changes each time the configuration of the PLC changes, for example, each time the nodes and/or communication protocols that are connected to and/or used with the PLC changes.

In particular, food production plants as industrial installations are often complete systems with different processing stations or sections. The known systems are typically tailored to special applications, for example of filled pralines or bars, in order to enable high throughputs with high precision. The conversion from one food product to another food product is usually complex, sometimes even impossible. Chain conveyors and belt conveyors are usually installed in a fixed position between processing modules that are also installed in a fixed position. This is especially true for large systems where the production process is fixed and cannot be changed over. An exemplary food production plant is known from EP 940 086 A1, in which sections of the production line can be bridged by transfer devices, such as robots or pneumatic transfer devices, by transferring the food placed in the product carrier between mechanically independent sections. The processing stations are permanently installed, but not all of them have to be used. From EP 3 111 768 A1 a system for small batches is known in which industrial robots move the products between processing modules and, if necessary, process them on the way. Since industrial robots are rather slow, their use is not very suitable for high throughput, i.e. for the industrial production of food products. For manufacturers of high-quality food products, especially chocolate products, who produce small or medium quantities of seasonal products and for market testing, or who want flexible industrial processing, adaptable systems with easy handling and high hygienic standards are required. US 2019 0106283 reveals a conveyance apparatus according, which includes a conveyor configured to convey a workpiece, a support unit supporting the conveyor, and a work device which performs a work to the workpiece within a conveying range of the conveyor supported by the support unit.

However, in the prior art systems, the whole mostly manufacturer-specific plant control systems have to be costly rebuild by programming experts of the specific manufacturer if, for example, the sequence in processing units/stations within a process or production line has to be changed or adapted.

SUMMARY OF THE INVENTION

It is an object of the present invention to provide a system and method for plant operation control systems and supervisory process control applications which can be easily adapted to changing process lines, e.g. in respect to the architecture giving the sequence of processing units/steps within the process line, line layout based on arrangement of machines of the process line, i.e. the arrangement of machines within the production process. It is a further object to provide an adaptive process control system and architecture with a platform-independent supervisory process control and manufacturing information system application architecture where the control system framework can be easily designed and altered. In accordance with the disclosed architecture, an application object, e.g. a line control system, is hosted by an engine. The engine is hosted by a platform that can be run by computer means with infrastructure software. Thus, location within a physical manufacturer-specific system containing the plant control need not be addressed by the inventive object.

Further, in order to overcome the problems associated with the limited configuration capabilities of typical PLC controllers, various embodiments of the modular control system are disclosed. The modular control system may perform the same functionality of a typical control system, but will also include enhanced configurability, modular functionality and dynamic adaptability, as described below. In particularly, it is an object of the invention to develop a plant control system and process line/production line control system for the production and industrial processing of food products, especially chocolate products as moulding lines e.g. chocolate moulding lines, a modular arrangement for such a production or food processing plant as well as a method for automated adapting and retrofitting of the plant and process line control systems, which will reduce the disadvantages of the prior art, which in particular a high flexibility, dynamic and automated adaptability of the process line as well as the control system of the process line having a line controller providing a dynamically adaptable process line arrangement.

According to the present invention, these objects are achieved, particularly, by the features of the independent claims. In addition, further advantageous embodiments can be derived from the dependent claims and related descriptions.

According to the present invention, the above-mentioned objects related to a modular control system providing a dynamically adaptive process control of a process line of a plant in a Machine-to-Machine network are achieved, particularly, in that the process line of the plant comprises a plurality of distributed machine control system with one or more elements interlocked to one or more operational unit of the process line, wherein the operation of an operational unit performing a physical function within the process line is controlled by an associated machine control system by means of the elements interlocked to the operational units, the elements at least comprising IO-interfaces and actor control devices, in that the distributed machine control systems are accessible by an independent line control system via network interfaces, and messages containing monitoring data and/or signaling data and/or steering commands are transmittable between the line control system and the machine control systems, in that the modular control system comprises a plurality of communication channels, the plurality of communication channels operable to communicate between the line control system and the machine control systems, the machine control systems acting as network nodes in the Machine-to-Machine network, wherein each machine control system comprises a machine control system-specific identification, in that the modular control system comprises a control logic layer operable between the line control system and the machine control systems to transmit the messages for controlling, monitoring and steering of the operational units via the machine control systems, and in that the control logic layer accepts configuration parameters, the configuration parameters transmitted by a machine control system indicating at least a preceding machine control system and/or a subsequent machine control system within the process line based on machine control system-specific identifications, wherein the line control system dynamically structures and adjusts the process line by a detected sequence of machine control systems based on the transmitted configuration parameters.

BRIEF DESCRIPTION OF THE DRAWINGS

The present invention will be explained in more detail by way of example in reference to the drawings in which:

FIG. 1 shows a block diagram illustrating schematically an exemplary predefined process line and machine and a modular process line and machine with a adaptable line arrangement. In particular, food production plants as industrial installations are often complete systems with different processing stations or sections. The known systems are typically tailored to special applications, for example of filled pralines or bars, in order to enable high throughputs with high precision. The of the process line arrangement is typically complex, or even impossible. Chain conveyors and belt conveyors are usually installed in a fixed position between processing modules that are also installed in a fixed position. This is especially true for large systems where the production process is fixed and cannot be changed over.

FIGS. 4.1 and 4.2, FIG. 4.1 shows the physical structure behind the modular control system 1, while FIG. 4.2 provides an example based on a moulding line 301. In the drawing, the plant 30 is referred as site and the process line 301 is given by the line (LN). In FIG. 4.1, the operational units 302 comprise the units (UN) with one or more equipment modules (EM), which is in the example of FIG. 4.2 represented by the depositor unit (UN) comprising the mould transport (EM) and the tempering unit (EM), and the shaker (UN) represented by the mould transport (EM) and shaking table (EM). As illustrated in FIG. 4.1, each unit (UN) and/or equipment module (EM), representing on the programming level an operational unit 302, is associated with at least one machine control system 20 on the hardware level steering and controlling the control modules (CM) by means of the interlocked elements 303 comprising IO-Interfaces 303 1and the actor control devices 3032. In example of FIG. 4.2, the control modules (CM) associated with the first mould transport (EM) control the servo (CM) and the valve (CM), the control modules (CM) associated with the tempering unit (EM) control the PID loop (CM), the pump (CM) and the valve (CM), the control modules (CM) associated with the second mould transport (EM) control the servo (CM) and the valve (CM), and the control modules (CM) associated with the shaking table (EM) control the first VFD axis (CM) and the second VFD axis (CM).

FIGS. 5.1, 5.2 and 5.3, FIG. 5.3 shows a possible state-model on the programming and interface level. The states comprise "waiting state", "active state" indicating "completing", "holding" or "suspending", and a separately marked "active state" indicating "execute" of the respective unit. The implementation can be based on the ISA standard 88/95 using e.g. PackML as a underlying structure for the control of the machines and the automation. PackML is in particular suitable, since PackML primary objective technically supports the objective of the present invention. The primary objective of PackML created by the Organization for Machine Automation and Control (OMAC) in conjunction with the International Society of Automation (ISA) is to bring a operational consistency to all machines that make up a discrete process line or other types of discrete process flow. PackML provides, inter alia, (i) standard defined machine states and operational flow, (ii) Overall Equipment Effectiveness (OEE) data, (iii) Root Cause Analysis (RCA) data, and (iv) Flexible recipe schemes and standardized SCADA or MES inputs. FIG. 5.1 illustrate a possible implementation of a commands interface, i.e. an interface to exchange the command messages 4021 for controlling, monitoring and steering of the operational units 302 via the machine control systems 20 steered by the line control system 10. Further, FIG. 5.2 illustrate a possible implementation of a conditions interface, i.e. the interface to exchange the configuration parameters 4022 transmitted by a machine control system 20 indicating states of the operational units 302. The commands interface and conditions interface can be realized as one common interface, as commands-conditions interface. Both signaling exchanges form part of the control logic layer 402 between the line control system 10 and the machine control systems 20. The commands interface and conditions interface can use different ports to transmit the command messages 4021 and condition signaling data, i.e. the configuration parameters 4022, or can be configured to work over one common port. Thus, the modular control system 1 can be realized with a common interface using PackML as state machine PackML, and the commands-conditions interface described above.

DETAILED DESCRIPTION OF THE PREFERRED EMBODIMENTS

Figure 2:
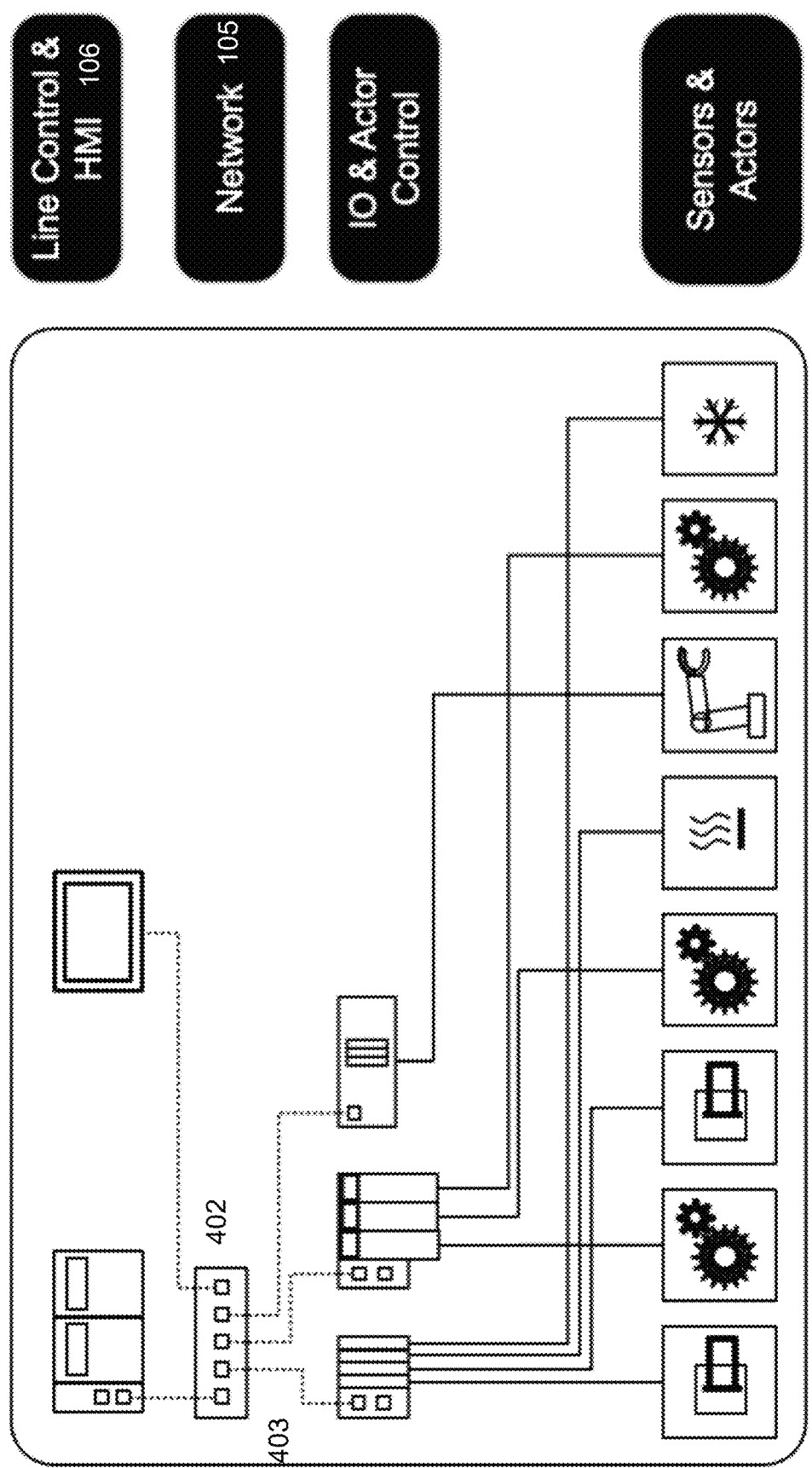
FIG. 2 shows a block diagram illustrating schematically an exemplary prior art control system with a predefined production process based on a defined line layout, with defined electrical components and a defined process and line control and a defined data acquisition and presentation. The control architecture comprises line control system with HMI (Human Machine Interface), network, IO (input/output) and actor control, e.g. comprising PLC, and appropriate sensors and actors.
Figure 3:
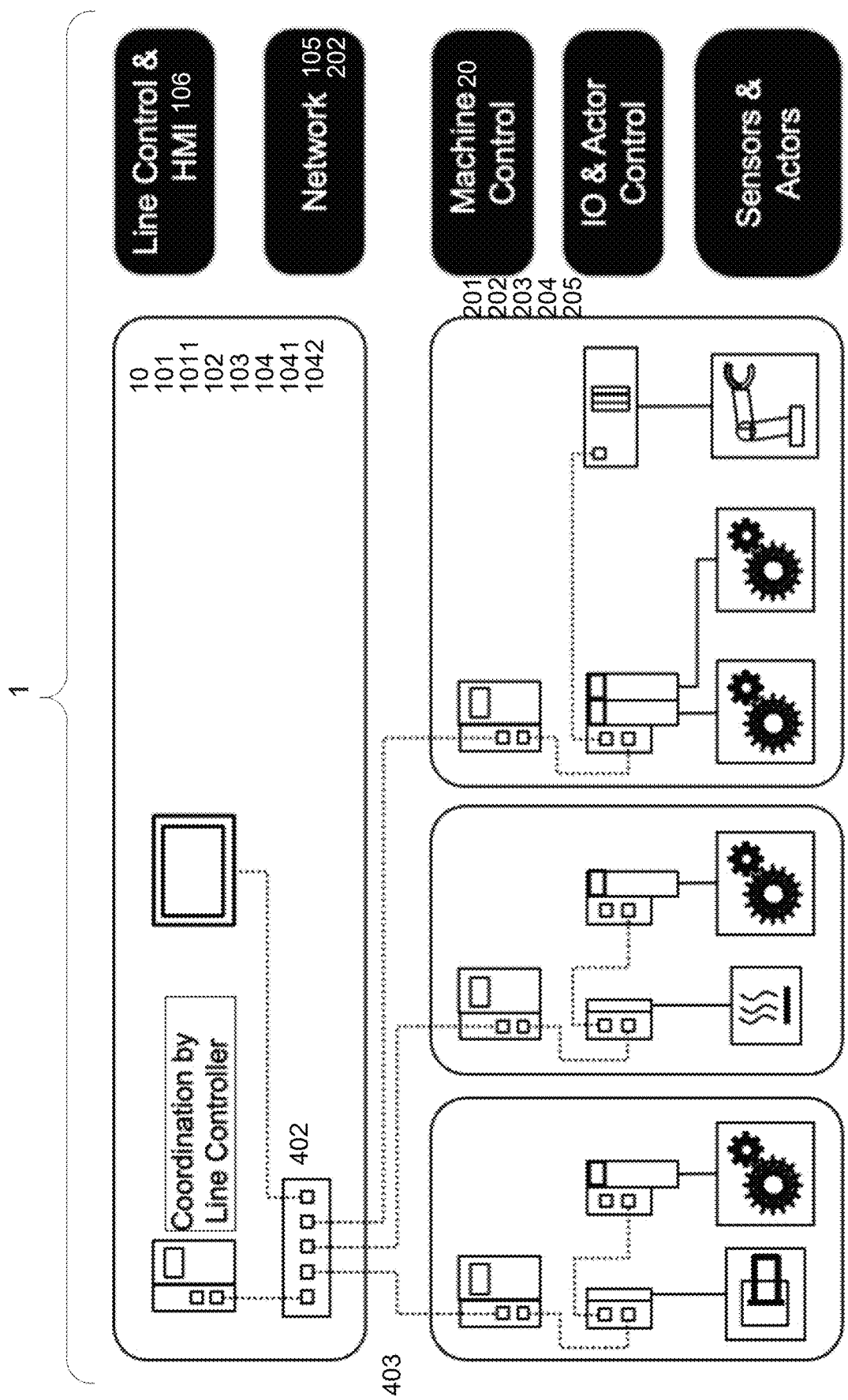
FIG. 3 shows a block diagram illustrating schematically an exemplary inventive control system 1 with an adaptive production process comprising modular processing modules or units, modular machine control systems and a dynamically self-adapting line control system.

FIG. 3 illustrates, schematically, an architecture for a possible implementation of an embodiment of the inventive method and system for a modular control system 1 providing a dynamically adaptive process control of a process line 301 of a plant 30 in a Machine-to-Machine network 403/M2M ("dynamically adaptive" is used herein in the sense of automatically recognizing new arrangements and technical layouts of the process line 30 land adapting its operation to the new arrangements and technical layouts of the process line 301. It has to be noted that layout as such can be modified by the control system 1 itself by monitoring or scanning periodically or on request new settings of a process line 301. However, the layout can also be adapted manually, e.g. by an operator, where the control system 1 adapts its operation dynamically based on the adapted layout of the process line 301). The process line 301 of the plant 30 comprises a plurality of distributed machine control system 20 with one or more elements 303 interlocked to one or more operational unit 302 of the process line 303. The operation of an operational unit 302, which performs a physical function within the process line 301, is controlled by an associated machine control system 20 by means of the elements 303 interlocked to the operational units 302. The elements 303 at least comprise IO-interfaces 3031 and actor control devices 3032. Thus, the process line 301, e.g. for the production of food products, especially chocolate products, can comprise operational unit 302 in which the products, e.g. the food products, can be processed and/or transported. For example, the operational units 302 can be a mould warmer, a cooling station, a casting station, a sleeve forming station, a cold stamping station, an opening forming station, a filling station, an insertion station, a shaking station, a lid station, a weigh station, a licking station, a decorating station, a demoulding station, a stacking and/or unstacking station, a spraying station, a printing station, an insertion station, a packaging station, a foil application station and/or a control station, or the same. To enhance the modularity also on the physical level of the operational units 302, the operational units 302 can be realized as standardized modules each having a module frame with a height, a width and a length which makes them interchangeable without redesigning the structure of the process line 301, if two or more modules have to be replaced or changed. Thus, in respect to the mechanical design of the modularity: the individual machines have a grid dimension or system dimension for the different mechanical features. However, this is not a requirement for the realization of the modular control system 1, as such.

The distributed machine control systems 20 are accessible by an independent line control system 10 via network interfaces 105/202, where messages and/or signaling data containing monitoring/condition data and/or signaling/configuration data and/or steering commands are transmittable between the line control system 10 and the machine control systems 20. The line control system 10 can be realized in situ, i.e. at the plant 30, or decentralized at any location accessible by the data transmission network 40. However, since the line control system 10 is typically realized as a link between the control level and process control level, it is normally realized in situ. It has to be noted, that for the embodiment variant of a decentralized line control system 10 further technical requirements for the data transmission network 10 may be crucial, such as real-time or quasi real-time capability for synchronization of the machines. In the above example, these requirements are only covered by the LAN interface, but need to be evaluated in this case also for the other examples of transmission options. For example, the network 40 can comprise the world-wide back-bone network Internet. Thus, the control system 1 can be operated centralized, in particular by a provider of line control system 10 and appropriate machine control systems 20. However, the network interface 105 of the line control system 10 and the network interface 202 of the machine control systems 20, for example, may include interfaces to WLAN (Wireless Local Area Network), Bluetooth, GSM (Global System for Mobile Communication), GPRS (Generalized Packet Radio Service), USSD (Unstructured Supplementary Services Data), UMTS (Universal Mobile Telecommunications System) and/or Ethernet or another wired LAN (Local Area Network) etc. Accordingly, the data transmission network 40 may stand for or comprise various heterogeneous networks, such as, for example, a Bluetooth network, for example for installations in covered localities, a mobile-radio network with GSM and/or UMTS etc., a wireless LAN, for example based on IEEE wireless 802.1x, but also on a wired LAN, i.e. on a local fixed network, in particular also on the PSTN (Public Switched Telephone Network) etc. As a matter of principle it should be stated that the process and/or system is not tied to a specific network standard—provided that the features according to the invention are present—but may, if it has been realized via a network 40, be realized with an arbitrary LAN. The interfaces may be not only packet-switched interfaces, such as are utilized directly by network protocols such as, for example, Ethernet or token ring, but also circuit-switched interfaces, which can be utilized by means of protocols such as, for example, PPP (Point to Point Protocol), SLIP (Serial Line Internet Protocol) or GPRS (Generalized Packet Radio Service) i.e. which interfaces, for example, do not possess a network address such as a MAC address or a DLC address. It is to be noted, that in the latter embodiment variant, other identifications have to be used for the configuration of the layouts, since otherwise, simply the network address/IP address may be used for the configuration of the layouts, i.e. the process line layout 1011. As mentioned in part, the communication between the line control system 10 and the machine control system 20 can be effected via the LAN and/or the worldwide backbone network Internet, for example by means of special short messages, for example SMS (Short Message Services), EMS (Enhanced Message Services), via a signaling channel, such as, for example, USSD (Unstructured Supplementary Services Data) or other technologies, such as MExE (Mobile Execution Environment), GPRS (Generalized Packet Radio Service), WAP (Wireless Application Protocol) or UMTS (Universal Mobile Telecommunications System) or via IEEE wireless 802.1x or another useful channel.

Figure 6:
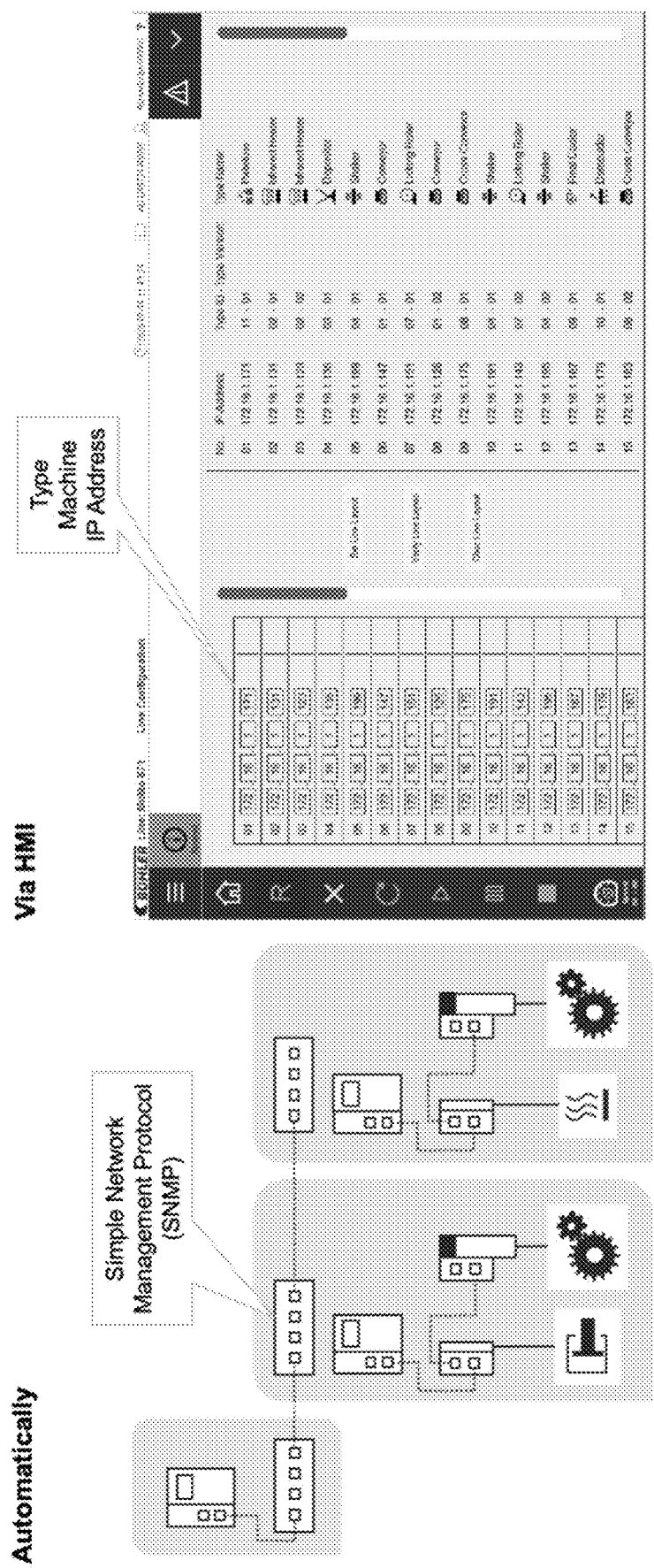
FIG. 6 shows a block diagram illustrating schematically an exemplary inventive control system 1 with two option for setting up the line layout at the line control system 10, namely (i) automatically by triggering the type of machine using the Simple Network Management Protocol (SNMP) based on the transmitted IP-addresses of the machines, or (ii) via the HMI providing the process line 301 by a manual adhoc process line configuration.

As illustrated in FIG. 6, the line control system 10 can comprise a human machine interface 106/HMI dynamically adapting a process line layout 1011 based on the configured, pre-configured or detected sequence of the machine control systems 20 within the process line 301, the process line layout 1011 being presentable to a user via the human machine interface 106/HMI for user-interaction with the operations within the process line 301. Further, the line control system 10 can comprise a controller which operates, in the modular control system 1, the control logic of the modular control system 1 and the line control system 10, respectively, independently of other controllers forming e.g. part of the machine control systems 20 and comprising for example PLCs to operate the operational units 301. When integrated into the line control system 10 as a distributed process control system, the controller of the line control system 10 can operate the one or multiple machine control system 20, which form one or more process lines 301 of a process plant 30. The configured layout may be operated synchronously as a part of the process line 301. Configuration parameters 4022 used by the controller may be imported or downloaded from a configuration database of the line control system 10 into one or more configuration databases of the distributed machine control system 20, where the former may comprise e.g. a central repository of configuration data of the line control system 10. In some implementations, the controller is built natively on the platform of the line control system 10. The controller in this case can communicate with the machine control system 20 as nodes according to one or more communication protocols of the modular control system 1, which can also be proprietary in some implementations or use standard data transfer protocols. Thus, in other implementations, the line control system 10 and/or the controller communicates with the nodes of the machine control systems 20 using a standard industrial communication protocol.

The modular control system 1 comprises a plurality of communication channels 401. The plurality of communication channels 401 are operable to provide communicate between the line control system 10 and the machine control systems 20. The machine control systems 20 act as network nodes 203 in the Machine-to-Machine 403/M2M network, for example as IP-network nodes having a fixed MAC-address. Other standard communication and data transmission can be used as well. Each machine control system 20 comprises a machine control system-specific identification 204, which can be based on the IP-address of the machine control systems 20 as network node or the MAC-address (Media Access Control Address) assigned to a network interface controller (NIC) of the network interface 202 of the machine control system 20 or any other machine/network interface identicator. Communication channels herein refer to the physical transmission medium such as the physical data transmission network 40, as well as to the logical connection in the networking. The communication channels are used to transmit the information signal between the line control system 10 and the machine control systems 20, for example using a digital bit stream. Thus, communicating data between the line control system 10 and the machine control systems 20 requires a physical and logic pathway or medium. These pathways are called herein communication channels, using the appropriate types of media.

The modular control system 1 comprises a control logic layer 402 operable between the line control system 10 and the machine control systems 20 to transmit the messages 4021 or other data signaling for controlling, monitoring and steering of the operational units 302 via the machine control systems 20. The control logic layer 402 accepts configuration parameters 4022, the configuration parameters 4022 transmitted by a machine control system 20 indicating at least a preceding machine control system 20 and/or a subsequent machine control system 20 within the process line 301 based on machine control system-specific identifications 204, wherein the line control system 10 dynamically structures and adjusts the process line 301 by a detected sequence of machine control systems 20 based on the transmitted configuration parameters 4022. I.e. the process of detecting can be realized as follows: Based on the configured IP address list, a connection is established with the machines one after the other. After a connection is established, the machine identification is exchanged using a data packet (configuration parameters). Further, the control logic layer 402 accepts command messages 4021 for the controlling, monitoring and steering of the operational units 302 via the machine control systems 20 steered by the line control system 10 (see FIG. 5.1). As such, commands of the command messages 4021 control the machine and conditions of the command messages 4021 provide the feedback and monitoring of the processes. The configuration parameters can be exchanged when the line is set up and the control parameters can be exchanged cyclically thereafter. The transmitted configuration parameters 4022 can also comprise configuration parameters 4022 indicating states of the operational units 302. Thus, the transmitted configuration parameters 4022 may comprise both, configuration parameters and control parameters, where the configuration parameters are used for assembling the line and the control parameters for operating the line. In summary, the control logic layer 402 forms a logic commands interface and conditions interface, where both signaling exchanges form part of the control logic layer 402 between the line control system 10 and the machine control systems 20. The control logic layer 402 can be realized as one common interface, as commands-conditions interface, or forming differentiatable interfaces. This commands and conditions interface is extended for the inventive use beyond the interface frameworks known in the prior art, proving controlled transfer of control parameters from the line to the machine and status parameters from the machine to the line. The extension relates inter alia to cover the technical requirements of control parameters from machine to line. The control parameters 4022 indicating states of the operational units 302 can e.g. comprise "waiting state", "active state" indicating "completing", "holding" or "suspending", and a separately marked "active state" indicating "execute" of the respective unit (see FIG. 5.3). The implementation can be based on the ISA standard 88/95 using for example PackML (e.g. PackML state machine release 2015) as a underlying structure for the control of the machines and the automation. PackML is in particular suitable, since PackML primary objective technically supports the objective of the present invention. The primary objective of PackML created by the Organization for Machine Automation and Control (OMAC) in conjunction with the International Society of Automation (ISA) is to bring a operational consistency to all machines that make up a discrete process line or other types of discrete process flow. PackML provides, inter alia, (i) standard defined machine states and operational flow, (ii) Overall Equipment Effectiveness (OEE) data, (iii) Root Cause Analysis (RCA) data, and (iv) Flexible recipe schemes and standardized SCADA or MES inputs. Both signaling exchanges (commands/configurations) form part of the control logic layer 402 between the line control system 10 and the machine control systems 20, as described above. For example, the PackML state machine can be embedded in an existing Rockwell framework, where the latter is extended as described above. The commands interface and conditions interface can use different ports to transmit the command messages 4021 and condition signaling data, i.e. the configuration parameters 4022, or can be configured to work over one common port. Thus, the modular control system 1 can be realized with a common interface using PackML as state machine PackML, and the commands-conditions interface described above.

As a variant, the controller allows operating a plurality of configurable communication ports, where the controller may be included as part of a modular control system 1 and the line control system 1, respectively. The controller may include the control logic layer 402 operable to control the machine control systems 20 and the operational units 301 of a process plant 30, respectively. The operational units 301 are configured to perform a physical function within the process line 30 as described herein. The plurality of communication ports may include a first set of communication ports and a second set of communication ports. In this embodiment variant, the controller accesses the control logic layer 402 as a software layer that accepts the configuration parameters 4022, the machine control commands 4023, and additionally port configuration parameters. The port configuration parameters may define one or more port communication rules for the first set of communication ports and for the second set of communication ports. The one or more port communication rules may also cause the control logic layer 402 to selectively allow or restrict retransmission of incoming messages or data signaling, where the incoming messages are received at either the first set of communication ports or the second set of communication ports depending on their contribution to the configuration parameters 4022 or the machine control commands 4023, i.e. the first set of communication ports being used for the communication of the configuration parameters 4022 between the line control system 10 and the machine control systems 20, while the second set of communication ports being used for the communication of the machine control commands 4023 between the line control system 10 and the machine control systems 20.

The controlling and/or monitoring and/or steering of the operational units 302 via the machine control systems 20 can be dynamically adaptable by the line control system 10 based on the dynamically adapted process line 301. The controlling and/or monitoring and/or steering by the line control system 20 can be at least related to controlling and/or monitoring and/or steering of one or more operations to be performed or performed by the operational units 302 via the associated machine control system 20. The operational units 302 can be controlled by means of the machine control systems 20 comprising programmable logic controllers 201/PLC via the plurality of interlocked elements 303. Each machine control systems 20 can comprise a defined rage of performable operations processable or conductible by the operational units 302 associated with the respective machine control system 20.

As discussed above, a production process of the process line 301 is based on the modular adaptable sequence of machine control systems 20 with associated operation units 302 within the process line 301. The sequence of machine control systems 20 with associated operation units 302 within the process line 301 can e.g. be dynamically adaptable by restructuring the process line 301 at the plant 30 triggering a dynamic and automated reconfiguration of the process line layout 1011 at the line control system 10. It is to be noted, that the line layout can be adapted by periodically (or on request) scanning the process line 301 by the system. However, the line layout can also be set manually, triggering the dynamical adaption and restructuring by the system. Thus, the machine control systems 20 can provide a command and condition interface between the line control system 10 and operational units 302 specified by their performable operations. For this, a line process engine 11 of the line control system 10 can e.g. comprise a library 141 with identifications 204 and assigned line control commands and parameters 1042 for different machine control systems 20 to provide the common interface, wherein the dynamical structuring and adjustment of the process line 301 by the detected sequence of machine control systems 20 is based on the transmitted configuration parameters 4022 and the machine control commands 4033 extracted from the library 141. The communication over the control logic layer 402 can e.g. be based on Simple Network Management Protocol 404/SNMP providing identification of a machine control system 2 using the IP-address of the machine control system 2, the machine control system 2 acting as an IP-network node within a IP-network.

As a further embodiment variant, the control logic layer 402 can accept Logix tag-based alarming parameters providing the alarming control parameters for the line control system 10. As already described, the machine control systems 20 accessible by the line control system 10 via network interfaces 105/202, and the monitoring data and/or signaling data and/or steering commands can e.g. follow a defined state model structure being based on the ISA standard 88/95 for the control of the machines and the automation. The state model structure can e.g. be based on PackML as a underlying structure for the control of the machines and the automation. The configuration parameters 4022 can further comprise parameters indicating the current state of an operational unit 302 following a predefined state model.

LIST OF REFERENCES

1 Modular control system
10 Line control system
101 Line process engine
1011 Process Line Layout
102 Supervisory control and data acquisition unit
103 Line Controller Unit
104 Process Line Creator Unit
1041 Library with selectable line control command records assigned to different machine control systems
1042 Line control command record comprising to a specific machine control system selectable line control commands/machine control parameters
105 Network interface of the line control system
106 Human-Machine-Interface (HMI)
20 Machine Control System
201 Programmable logic controllers (PLC)
202 Network interface of the machine control system
203 Network Node
204 Machine control system-specific Identification
205 Ports of the Machine Control System
30 Plant
301 Process Line/Production Line, e.g. Moulding Line
302 Operational units
303 Interlocked elements
3031 IO-Interface
3032 Actor Control Device
40 Data transmission network
401 Communication Channels
402 Control Logic Layer
4021 Controlling, Monitoring and Steering Data Messages
4022 Configuration Parameters
4023 Machine Control Commands
4024 Logix tag-based alarming Parameters
403 Machine-to-Machine Network (M2M)
404 Simple Network Management Protocol (SNMP)

What is claimed is:

1. A modular control system providing a dynamically adaptive process control of a process line of a plant in a Machine-to-Machine network, the process line of the plant comprises a plurality of distributed machine control systems each having programmable logic controllers (PLCs) and one or more elements interlocked to one or more operational units of the process line, the one or more operational units controlled by way of the plurality of distributed machine control systems, wherein one or more operations of the one or more operational unit performing a physical function within the process line is controlled by an associated machine control system of the plurality of machine control systems by way of elements interlocked to the one or more operational units, the interlocked elements at least comprising IO-interfaces and actor control devices, each operational unit adapted to be signaled by its associated machine control system to perform one or more operations, wherein the plurality of distributed machine control systems is accessible by a line control system, the line control system having a line controller adapted to provide a dynamically adaptable process line arrangement, via network interfaces, and messages containing monitoring data and/or signaling data and/or steering commands that are adapted to be transmittable between the line control system and the plurality of distributed machine control systems in real-time or quasi real-time, wherein the controlling and/or monitoring and/or steering of the one or more operational units via the plurality of distributed machine control systems is at least related to the one or more operations to be performed and is dynamically adaptable, wherein the modular control system comprises a plurality of communication channels, the plurality of communication channels operable to communicate between the line control system and the plurality of distributed machine control systems, the plurality of distributed machine control systems acting as network nodes in the Machine-to-Machine network, wherein each machine control system comprises a machine control system-specific identification, wherein the modular control system comprises a control logic layer positioned between the line control system and the plurality of distributed machine control systems, operable to mediate transmission of messages for controlling, monitoring, and steering of the one or more operational units via the plurality of distributed machine control systems, wherein the plurality of distributed machine control systems are configured to provide a common interface between the line control system and the one or more operational units, the common interface being specified by performable operations of the one or more operational units, and wherein the line control system comprises a line process engine having a library with identifications and assigned line control commands and parameters for different machine control systems to provide the common interface, wherein the dynamic structuring and adjustment of the process line is based on configuration parameters transmitted by the plurality of distributed machine control systems and corresponding machine control commands extracted from the library, and wherein the control logic layer accepts the configuration parameters, the configuration parameters indicating at least a preceding machine control system of the plurality of distributed machine control systems and/or a subsequent machine control system within the process line based on machine control system-specific identifications, wherein the line control system dynamically structures and adjusts the process line by a detected sequence of machine control systems based on the configuration parameters.

2. The modular control system according to claim 1, wherein the controlling and/or monitoring and/or steering of the one or more operational units via the plurality of distributed machine control systems is dynamically adaptable by the line control system based on the dynamically adapted process line.

3. The modular control system according to claim 2, wherein the controlling and/or monitoring and/or steering by the line control system is at least related to one or more operations to be performed by the one or more operational units signaled by means of the associated machine control system.

4. The modular control system according to claim 1, wherein the one or more operational units are controlled by means of the plurality of distributed machine control systems comprising programmable logic controllers via the plurality of interlocked elements.

5. The modular control system according to claim 1, wherein each machine control system of the plurality of distributed machine control systems comprises a defined range of performable operations processable or conductible by the one or more operational units associated with the respective machine control system.

6. The modular control system according to claim 1, wherein the line control system comprises a human machine interface dynamically adapting a process line layout based on the detected sequence of the plurality of distributed machine control systems within the process line, the process line layout being presentable to a user via the human machine interface for user-interaction with the one or more operations within the process line.

7. The modular control system according to claim 1, wherein a production process of the process line is based on a modular adaptable sequence of the plurality of distributed machine control systems with associated one or more operation units within the process line.

8. The modular control system according to claim 7, wherein the modular adaptable sequence of machine control systems of the plurality of distributed machine control systems with associated one or more operation units within the process line is dynamically adaptable by restructuring the process line at the plant triggering a dynamic and automated reconfiguration of the process line layout at the line control system.

9. The modular control system according to claim 1, wherein the communication over the control logic layer is based on Simple Network Management Protocol providing identification of a machine control system of the plurality of distributed machine control systems using the IP-address of the identified machine control system, the identified machine control system acting as an IP-network node within an IP-network.

10. The modular control system according to claim 1, wherein the control logic layer accepts Logix tag-based alarming parameters providing the programmable alarming control parameters for the line control system.

11. The modular control system according to claim 1, wherein the plurality of distributed machine control systems is accessible by the line control system via network interfaces, and the monitoring data and/or signaling data and/or steering commands follow a state model structure being based on the ISA standard 88/95 for control of the machines and the automation.

12. The modular control system according to claim 1, wherein the state model structure is based on PackML as an underlying structure for the control of the machines and the automation.

13. The modular control system according to claim 1, wherein the configuration parameters further comprise parameters indicating the current state of an operational unit of the one or more operational units following a predefined state model.

14. The modular control system according to claim 1, wherein the control system is further at least partly operated centralized by a provider of the line control systems and appropriate machine control systems of the plurality of machine control systems.

* * * * *